Sept. 13, 1938.  R. W. BROWN  2,130,314
VARIABLE SPEED TRANSMISSION
Filed Dec. 16, 1935   2 Sheets-Sheet 1

INVENTOR.
Ralph W. Brown

Sept. 13, 1938. R. W. BROWN 2,130,314
VARIABLE SPEED TRANSMISSION
Filed Dec. 16, 1935 2 Sheets-Sheet 2
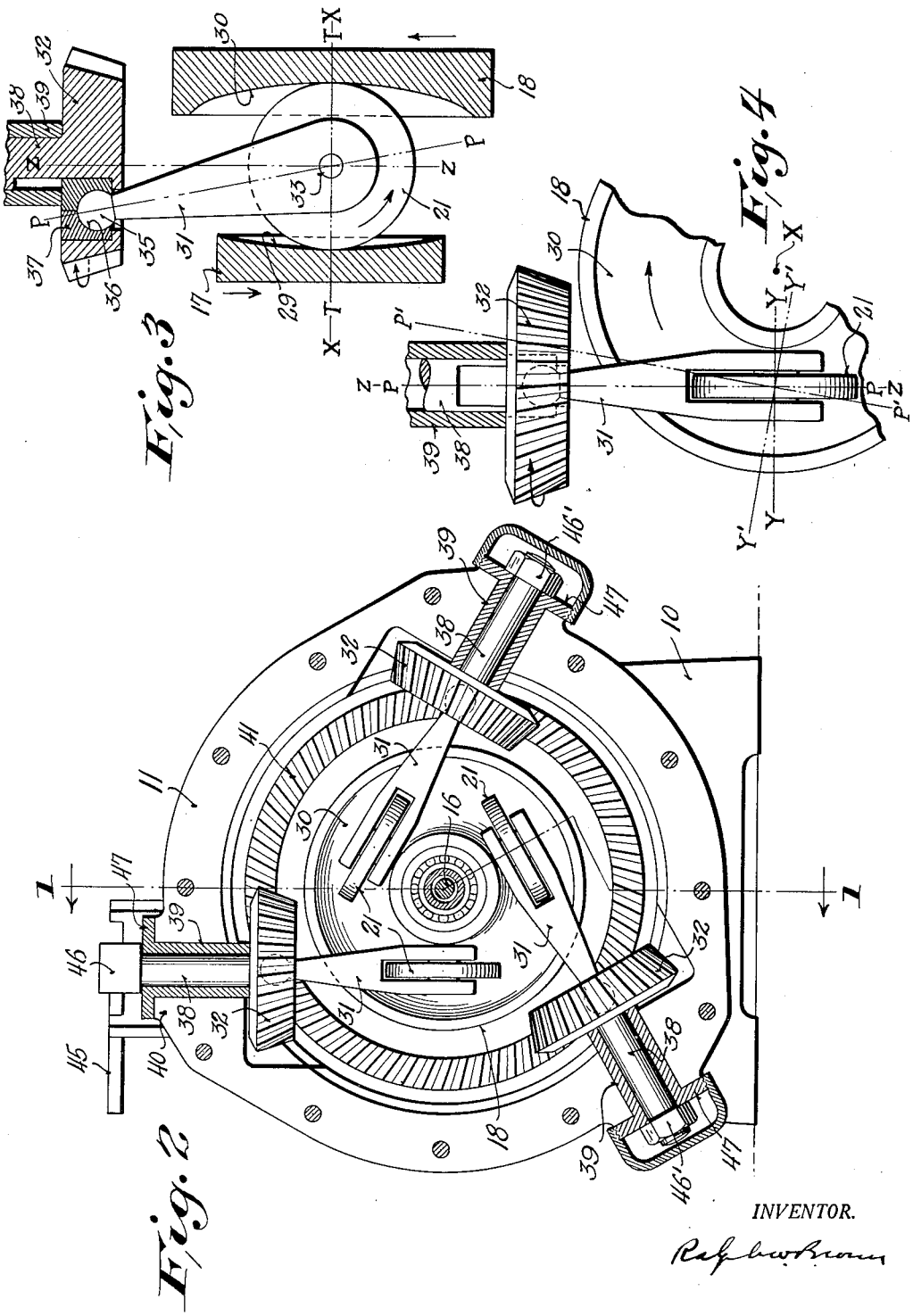
INVENTOR.
Ralph W Brown Patented Sept. 13, 1938

2,130,314

UNITED STATES PATENT OFFICE 2,130,314

VARIABLE SPEED TRANSMISSION

Ralph W. Brown, Shorewood, Wis., assignor to The Falk Corporation, Milwaukee, Wis., a corporation of Wisconsin Application December 16, 1935, Serial No. 54,608

12 Claims. (Cl. 74—200)

This invention relates to variable speed power transmissions of the adhesion type, wherein the power is transmitted from a driving to a driven disk through interposed rollers engaged in toric raceways provided in the opposed faces of the disks.

In transmissions of this type, the center of each roller is ordinarily fixed, or adjustably fixed, each roller being rotated about its center by contact with the driving disk and, by reason of such rotation, each serves to drive the driven disk in a direction opposite to that of the driving disk. The disks are coaxial and the rollers are normally disposed, so that the axis of rotation of each is coplanar with and thus intersects the common axis of rotation of the disks, and when so disposed, each roller follows concentric circular paths in the raceways of the disks, and the driven disk rotates at a rate bearing a definite relation to that of the driving disk.

When the rollers are disposed so that their axes of rotation intersect the axis of rotation of the disks at right angles, each roller then follows circular paths of contact of equal diameters on the two disks, and the driven disk rotates at a speed equal to that of the driving disk; and when the rollers are angularly disposed so that their axes are inclined relative to the axis of the disks, then each follows paths of contact of different diameters on the two disks, and the driven disk rotates at a speed faster or slower than the driving disk depending upon the degree and direction of such angularity or inclination.

In transmissions of this type, various attempts have been made to effect speed variations by means variously designed to directly change the angularity of the rollers or the inclination of their axes relative to the axis of the disks. It is impossible, however, or at least impracticable, to so adjust the rollers, because of the high pressure contacts between them and the disks, and because such movement of the rollers necessarily involves a destructive rubbing action thereof against the faces of the raceways.

It has also been heretofore proposed to effect a speed varying angular adjustment of the rollers indirectly, by first shifting or tilting them so as to displace their axes out of coplanar relationship with the axis of the disks, thereby causing each roller to follow spiral rather than circular paths on the two disks, the path on one disk comprising a spiral of increasing radius and that on the other disk one of decreasing radius. This precession of the rollers effects a speed change, but serious difficulties arise in properly limiting this action, so as to effect the degree of change desired, in synchronizing the angular movement of the rollers, and in ultimately and simultaneously returning them to that stable condition in which their axes are again coplanar with the axis of the disks and uniformly angularly related thereto. For various reasons, including the mechanical complications involved and the precise refinements required, the various devices heretofore designed for thus regulating and controlling the rollers have not proven entirely satisfactory.

An object of the present invention is to provide an improved simple and effective speed regulator for transmissions of this type by which speed changing variations in roller inclination are accurately obtained by simultaneously displacing the roller axes from coplanar relation with the disk axis, to effect precession of the rollers, and in such manner as to assure automatic return of those axes to that coplanar relation as the individual rollers accurately assume the inclination desired.

Another object is to provide a speed regulator of the character above defined by which the rollers are thus adjusted and controlled without involving lateral displacement of their peripheries from their paths of contact with the disks or otherwise causing a destructive rubbing action between them and the disks.

In transmissions of this type, it is universal practice to mount the rollers in carriers by which they are forced to assume definite positions relative to the disks and which are commonly actuatable with a view to forcing the rollers into various speed changing positions.

Another object is to avoid the use of carriers so that the rollers are self-centering relative to the disks and their raceways, thereby eliminating precise mechanical refinements heretofore required, and avoiding those objectionable artificial forces which commonly result from inevitable mechanical inaccuracies in the carriers.

Other more specific objects and advantages will appear, expressed or implied, from the following description of a transmission embodying this invention.

In the accompanying drawings:—

Fig. 2 is a transverse sectional view on the line 2—2 of Fig. 1.

Fig. 3 is a sectional view on the line 3—3 of

Figure 1:
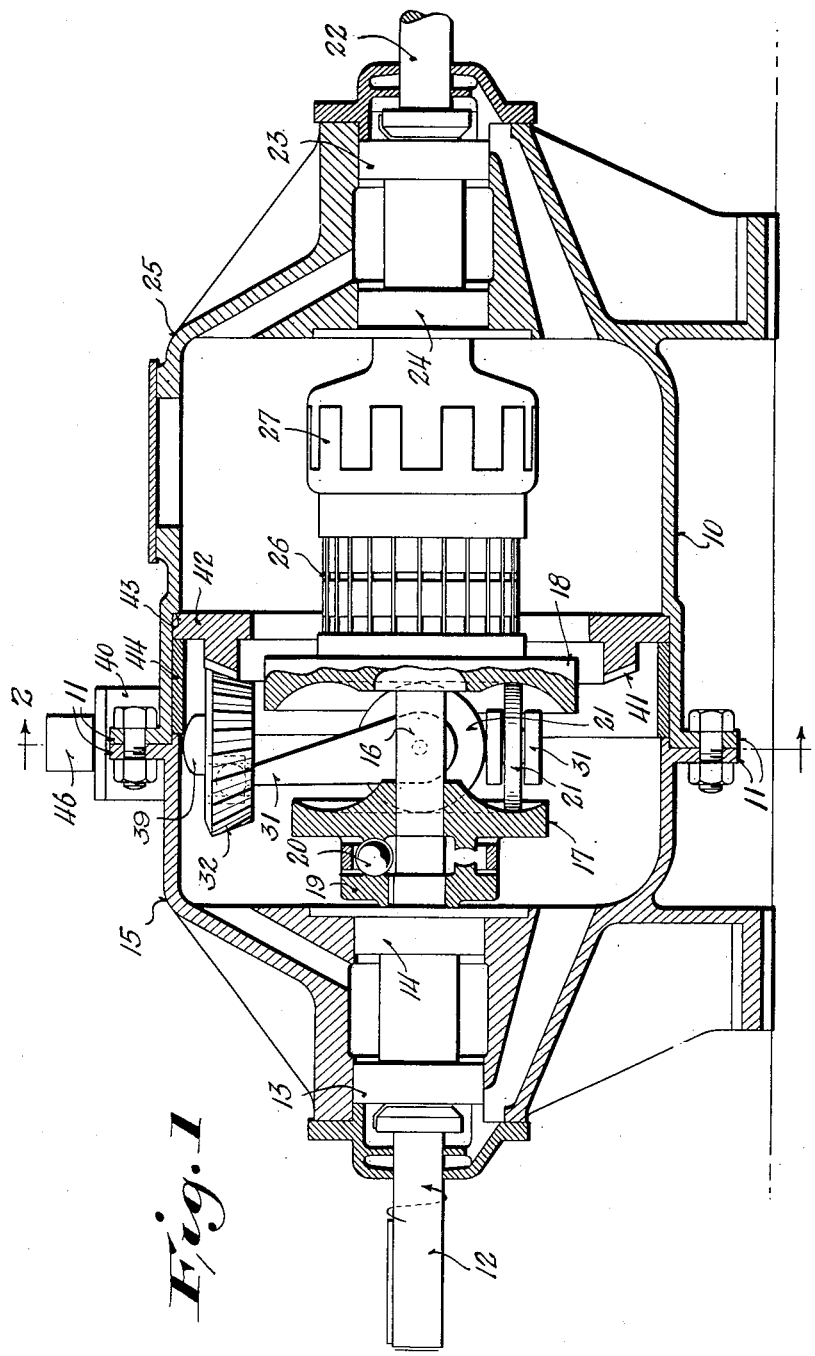
Figure 1 is a longitudinal sectional view, taken on the line 1—1 of Fig. 2, of a variable speed power transmission constructed in accordance with the present invention.

Fig. 2, including a face view of a roller with its control pinion in section.

Fig. 4 is a view at right angles to Fig. 3, including an edge view of the roller.

The transmission shown is contained in and supported by a two part housing 10, separably connected intermediate its ends by bolted flanges 11. A drive shaft 12, journalled in spaced bearings 13 and 14 in the forward end 15 of the housing, has an extension 16 which provides support for the driving and driven disks 17 and 18 rotatable thereon.

The driving disk 17 is driven from the drive shaft 12 through a torque transmitting, thrust inducing connection of a well known type, including a collar 19 keyed to the shaft and a set of balls 20 interposed between opposed cam surfaces on the collar and disk.

The driven disk 18 is driven from the driving disk 17 through the rollers 21 interposed therebetween. The driven shaft 22, journalled in spaced bearings 23 and 24 in the rear end 25 of the housing, is driven from the disk 18 through a torsionally resilient coupling 26 and a flexible coupling 27. The required pressure contact between the disk 18 and rollers 21 is sustained by a thrust mechanism (not shown) supported by the shaft extension 16 within and between the couplings 26 and 27.

Since the specific construction and arrangement of the parts hereinabove mentioned are not essential to an understanding of the present invention, and since they are fully described in the copending application of Walter P. Schmitter, Serial No. 662,692, filed March 25, 1933, which matured into Patent No. 2,016,248, October 1, 1935, further description thereof herein is deemed unnecessary.

Three rollers 21 are shown floatably supported and confined by and between toric raceways 29 and 30 formed in the opposed faces of the disks 17 and 18. The two raceways are concentrically curved transversely, the radius of curvature being equal to a roller radius, so that the two raceways combine to define, or partially define, an annulus which may be described as generated by rotation of a circle about the axis of rotation X—X of the disks, the generating circle being of a diameter equal to that of a roller. Each roller is centered solely by the raceways, so that the center of each coincides with the common center of transverse curvature of the raceways, and so that a line T—T, passing through the points of contact of each roller with the raceways, coincides with a diameter of the generating circle. This line T—T will hereinafter be termed the axis of tilt of the roller.

Each roller 21 is controlled in this instance by a separate tongue or link 31, each supported at one end by the roller, and angularly fixed relative to the axis of rotation of the roller, the other end being adjustably supported by a control element, herein shown as a bevel pinion 32. In this instance a shaft 33, fixed to each roller, is journalled at its opposite ends in the bifurcated inner end of the link 31, so that the axis of rotation Y—Y of the roller is at right angles to the longitudinal axis of the link.

The forward end of each link 31 is flexibly connected to the pinion 32 through a suitable joint, which in this instance comprises a spherical head 35 on the link, snugly seated in a spherical socket 36 in a bushing 37, mounted eccentrically of and in the pinion. The bushing shown is withdrawable through the rear of the pinion and is longitudinally split so that when withdrawn it may be separated to release the head 35.

Each pinion, as shown at 32, is carried by an integral stub shaft 38, journalled in a flanged bushing 39, removably fixed in a split bearing hub 40, formed upon the mating ends of the housing sections. Each shaft 38 is preferably so disposed that its axis, and the axis of rotation Z—Z of its pinion 32, is aligned with the center of its connected roller 21, so that the position of the roller center will not be disturbed when the link 31 is swung by rotation of the pinion.

The several pinions 32 mesh with a hypoid gear 41 which is carried by a ring 42, rotatably seated on the wall of the housing and confined between an internal shoulder 43 and a spacer sleeve 44 removably fixed in the housing. Simultaneous and equal rotation of the several pinions is thus assured. In this instance they are actuated by a handle 45 projecting from a hub 46 removably fixed to the end of one of the shafts 38. The hub 46 coacts with the end of the supporting bushing 39 to hold the shaft and pinion against axial displacement, and nuts 46' on the ends of the other shafts serve a like purpose. The several pinions 32 may be axially adjusted into accurate meshing relation with the gear 41 by the use of shims beneath the end flanges 47 of the bushings 39.

It will be noted that the ball-and-socket joint between each pinion 32 and connected link 31 permits the pinion to rotate with respect to the link. It will also be noted that the link 31, though bearing a fixed angular relation to the axis of rotation Y—Y of its connected roller 21, may swing about that axis or with that axis about the axis of tilt T—T of the roller, when its connected pinion is rotated, and it may also turn about its longitudinal axis P—P, which extends through the center of its head 35 and the roller center, in response to angular displacement of the roller within its raceways. The axis P—P will be referred to hereinafter as the axis of precession.

It will be further noted that, due to the eccentric mounting of each head 35 within its pinion 21, the axis of precession P—P is inclined relative to a plane passing through the roller centers normal to the axis of the disks, and that it is inclined toward that quadrant of the driving disk which is approaching the roller.

Since all of the rollers 21 are simultaneously and similarly affected by operation of the regulating mechanism above described, an explanation for one will suffice for all. It is of course understood that regulation of the rollers is effected during operation of the disks.

With a control pinion 32 in the position shown, the axis of precession P—P and the axis Z—Z of the pinion lie in a plane which is parallel to the axis of the disks and tangent to that imaginary circle which passes through the centers of the several rollers. This plane will hereinafter be referred to as the tangent plane. In this position of the pinion the axis of rotation Y—Y of the roller intersects the axis X—X of the disks at right angles, and the central plane of rotation of the roller coincides with the tangent plane, so that the roller lies parallel to the axis of the disks and the driven disk 18 rotates at a speed equal to that of the driving disk 17.

To effect a predetermined increase in the speed of the driven disk 18, each pinion 32 is rotated in the direction of the arrow (Figs. 3 and 4) through a predetermined angle, so as to tilt the roller and its axis of precession P—P, about the axis of tilt T—T, into a predetermined angular position, such as indicated by the dotted line P'—P' of Fig. 4. This of course results in a downward tilting of the axis of rotation Y—Y of the roller from the axis of the disks toward the dotted line position Y'—Y' of Fig. 4. The roller, thus tilted, immediately follows a spiral path of increasing radius in the raceway of the driving disk 17 and a spiral path of corresponding decreasing radius in the raceway of the driven disk 18, causing the roller to rock or precess about the axis P'—P' in the same general direction that its control pinion 32 had been rotated.

During this precession of the roller, its axis of rotation of course swings about the axis P'—P', in a plane which is of course normal to the latter and inclined toward the axis X—X of the disks, until the roller axis again intersects the axis X—X, when the roller again assumes a stable position following circular paths in the raceways of the disks. In this new position, the roller is inclined from its original position to an extent corresponding to the extent of rotation of its control pinion and in the same direction, so that the new circular path of contact with the driving disk is of greater diameter than the new circular path of contact with the driven disk, causing the driven disk to rotate at increased speed.

It has been found that the point at which the axis of rotation of a roller will ultimately intersect the axis of the disks is dependent upon the angle of inclination of the axis P—P with respect to the tangent plane, and also upon the angle of inclination of that axis with respect to that plane which passes through the roller centers normal to the disk axis; and, although in the control system shown, both of those angles are simultaneously varied by rotation of the control pinion 32, a similar effect on the roller is produced by varying one of those angles only, so long as the other angle has a value other than zero.

A reduction in the rate of rotation of the driven disk is similarly obtained by rotating the control pinions 32 in a direction opposite to that indicated by the arrow. When thus rotated, the axis of precession P—P is tilted downwardly, the roller axis Y—Y is tilted rearwardly from the disk axis, the roller precesses in a direction to decrease the speed of the driven disk, and the roller axis swings toward and again ultimately intersects the disk axis, causing the roller to assume a new stable position following new circular paths of lesser diameter on the driving disk and of greater diameter on the driven disk.

It will be noted that a new and improved construction has been provided in which all roller supports or carriers, that would tend to interfere with the natural and correct centering of the rollers in their raceways, have been eliminated; in which each roller is free to tilt, without restraint, about that natural axis of tilt passing through its points of contact with the disks, in response to its control mechanism; and in which each roller is also free to precess about its axis of precession until it reaches that very definite position of adjustment selected by adjustment of its regulator.

Various changes may be made in the embodiment of the invention hereinabove specifically described without departing from or sacrificing the advantages of the invention as defined in the appended claims.

I claim:—

1. A variable speed transmission comprising a rotary member having a toric raceway, a roller frictionally engaging said raceway and regulatable to follow any of a plurality of circular paths in said raceway, and means for regulating said roller comprising an element offset from and fixed with respect to the axis of rotation and center of said roller and movable to tilt said roller about an axis fixed with respect to said axis of rotation and passing through a point of contact of said roller with said raceway.

2. A variable speed transmission comprising a rotary member having a toric raceway, a roller frictionally engaging said raceway and regulatable to follow any of a plurality of circular paths in said raceway, and regulating means for said roller comprising an element having a portion offset from and fixed with respect to the axis of rotation and center of said roller and movable to tilt said roller about an axis coplanar with the axis of the raceway and fixed relative to said axis of rotation.

3. A variable speed transmission comprising a rotary member having a toric raceway, a roller frictionally engaging said raceway, said roller having an axis of rotation and an axis of tilt both rockable with said roller to vary the speed ratio of said transmission, and regulating means for said roller comprising an element having a portion offset from and fixed with respect to said axis of rotation and center of said roller and movable to tilt said roller about said axis of tilt.

4. A variable speed transmission comprising a rotary member having a toric raceway, a roller frictionally engaging said raceway, said roller having an axis of rotation and an axis of tilt rockable with said roller about a third axis to vary the speed ratio of said transmission, said third axis being fixed relative to said axis of rotation, and means including a member angularly disposed with respect to said axis of rotation and fixed relative to the latter and to said third axis for shifting said third axis relative to the axis of said raceway.

5. A variable speed transmission comprising a rotary member having a toric raceway, a roller frictionally engaging said raceway, said roller having an axis of rotation and an axis of tilt rockable with said roller about a third axis fixed relative to said axis of rotation and inclined relative to the plane of said raceway, and regulating means for said roller including a control element rockable about said third axis and actuatable to tilt said roller about said axis of tilt.

6. A variable speed transmission comprising a rotary member having a toric raceway, a roller frictionally engaging said raceway and regulatable to vary the speed ratio of the transmission, an element connected with said roller to swing about the axis of rotation thereof and to tilt with said axis and roller, and control means coacting with said element to regulate said roller.

7. A variable speed transmission comprising a rotary member having a toric raceway, a roller frictionally engaging said raceway, an element connected with said roller to swing about the axis of rotation thereof and to rock with said axis and roller, said element and roller also being rockable about an axis fixed relative to said axis of rotation and inclined relative to the plane of said raceway, and control means coacting with said element to regulate said roller and thereby regulate the speed ratio of the transmission.

8. A variable speed transmission comprising two relatively rotatable members, opposed concentric toric raceways provided on said members, a roller frictionally engaging said raceways and supported and centered thereby, said roller being tiltable about an axis passing through points of contact of said roller with said raceways, an element fixed relative to the axis of rotation and center of said roller and movable to tilt said roller about said axis of tilt, said element having a portion offset from the axis of rotation of said roller, and control means engaged with the offset portion of said element.

9. A variable speed transmission comprising two relatively rotatable members, opposed concentric toric raceways provided on said members, a roller frictionally engaging said raceways and supported and centered thereby, movable regulating means, and a control element in which said roller is journalled, said element being supported at one end by said roller and at its other end by said movable regulating means.

10. A variable speed transmission comprising two relatively rotatable members, opposed concentric toric raceways provided on said members, a roller frictionally engaged with and between said raceways, a trailer link in which said roller is journalled and having one end supported by the latter, and a support for the other end of said link movable to tilt said link and roller about the points of contact of said roller and raceways.

11. A variable speed transmission comprising two relatively rotatable members, opposed concentric toric raceways in said members, a plurality of rollers frictionally engaging both raceways, each of said rollers being supported by said raceways and centered solely thereby, said rollers being simultaneously rockable to vary the speed ratio of the transmission, a tiltable control element fixed with respect to the center of each roller, and control means operable to simultaneously and uniformly tilt said elements to thereby regulate the speed ratio of the transmission.

12. A variable speed transmission comprising two relatively rotatable members having opposed concentric toric raceways, a roller frictionally engaged with and between said raceways, and adapted to precess into various speed changing positions, an element in which said roller is journalled and having one end supported by the latter, and a support for the other end of said element cooperating with said roller to determine the position of the axis of precession thereof, said support being movable to shift said axis and thereby regulate said roller.

RALPH W. BROWN.